(12) United States Patent
Dietz et al.

(10) Patent No.: US 7,787,742 B2
(45) Date of Patent: Aug. 31, 2010

(54) COMPACT OPTICAL PERMANENT READ-ONLY RECORDING DISCS WITH READ-WRITE SECTIONS ENABLING USERS TO WRITE DATA TO PERSONALIZE THE DISCS TO THE USERS' NEEDS

(75) Inventors: Timothy Alan Dietz, Austin, TX (US);
Walid Kobrosly, Round Rock, TX (US);
Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2690 days.

(21) Appl. No.: 10/324,515

(22) Filed: Dec. 19, 2002

(65) Prior Publication Data

US 2004/0120239 A1    Jun. 24, 2004

(51) Int. Cl.
*H04N 5/91*    (2006.01)
*H04N 7/26*    (2006.01)

(52) U.S. Cl. ........................ 386/46; 386/124
(58) Field of Classification Search .............. 369/59.25; 375/240.16, 240.27; 386/113
See application file for complete search history.

(56) References Cited

U.S. PATENT DOCUMENTS 5,305,301 A * 4/1994 Ohga ...................... 369/275.3
5,783,371 A * 7/1998 Bifano ....................... 430/321
6,269,064 B1 * 7/2001 DeCusatis et al. ......... 369/59.25
6,738,333 B1 * 5/2004 Zaharris et al. ........... 369/59.25
7,020,663 B2 * 3/2006 Hay et al. ................. 707/104.1
7,045,188 B2 * 5/2006 Nee .......................... 428/64.1
7,051,054 B1 * 5/2006 Lee et al. .................... 707/205

* cited by examiner

*Primary Examiner*—Marsha D Banks Harold
*Assistant Examiner*—Oluwaseun A Adegeye
(74) *Attorney, Agent, or Firm*—J. B. Kraft; Steven L. Bennett

(57) ABSTRACT

A consumer is provided with an implementation to personalize his compact optical recording discs. A compact optical recording disc comprising a primary section including a read-only permanent digital data recording, and an ancillary read-write section enabling a user to digitally record data to thereby personalize the recording disc to the needs of the user. The section including the read-only permanent digital recording is on a spiral track on said recording disc, and the read-write section is on a spiral track extension continuous with the continuous track. The read-only spiral track comprises a layer of sequential bumps defining the permanent digital data recording pattern, and the read-write spiral track extension comprises a smooth layer of laser beam sensitive material, the material reversibly darkens upon exposure to define the digital data recording pattern.

1 Claim, 4 Drawing Sheets

COMPACT OPTICAL PERMANENT READ-ONLY RECORDING DISCS WITH READ-WRITE SECTIONS ENABLING USERS TO WRITE DATA TO PERSONALIZE THE DISCS TO THE USERS' NEEDS

TECHNICAL FIELD

The present invention relates to compact optical recording discs, particularly such discs that have permanent prerecorded read-only data, such as audio/video presentations, as well as texts and other books on disc.

BACKGROUND OF RELATED ART

The past decade has been marked by a technological revolution driven by the convergence of the data processing industry with the consumer electronics industry. An area where this relationship has been advantageous is that of digital video recording. A variety of digital recording devices have become the standard for video recording for the present generation. Digital audio/video recording has many advantages, including the ability to randomly access any portion of the digitally recorded content, higher definition video displays and longer storage life. This has resulted in the compact optical digital recording disc emerging as the standard for recording in the video and audio consumer electronic fields, and the advancement of the CD and DVD for their use as text and other books on disc that may be read by the consumer on a basic laptop computer. Books on disc are making great strides in relieving students of the "fifty-pound" book bags on college campuses.

Because of the extensive use and prominence of these digital recording discs, there has arisen a need to enable the user to record his personalization data in relation to a compact digital disc or a set of such discs in order to annotate and organize the discs. Until now, the user had to separately record any data that was ancillary to such compact discs on a computer that supported the compact digital discs. Since the compact digital discs (either CDs or DVDs) that contained the recordings of videos, audios, films or books, were read-only permanent digital recordings, such user personalization data could not be recorded on the discs. This created the rather cumbersome situation in which the discs had to be used in association with the computers that contained the personalization and disc organization data in order to get the benefit of such ancillary data.

The present invention provides one solution for such conditions. However, before considering the solution provided by this invention, we should review some CD and DVD background. A very thorough history and background of structures and manufacturing processes of both CD and DVD types of digital optically recorded discs may be found in the text: *DVDs Demystified*, by Jim Taylor, published by McGraw-Hill Professional Publishing, 2000/01. The basic CD (Compact Disc) is an injection molded piece of clear polycarbonate plastic material. The molded plastic is impressed with minute microscopic bumps arranged in a very long spiral track that is continuous and extends from the center of the disc. A thin layer of reflective aluminum is then sputtered onto the disc that covers the track of bumps and the aluminum is then covered with a thin layer of clear plastic. This provides a read-only spiral bump pattern on the track of reflective aluminum that may then be read by a reflective laser beam in the CD player to produce a digital output that is then suitably amplified to provide a digital display or audio output, or if an analog output device is used, then the output is applied to a D to A converter and then used for the video or audio output.

DVDs generally have the same diameter and thickness as CDs and are manufactured by similar methods, but the DVD has up to four layers of aluminum covered reflective bumps, with each layer being produced by a separate process in which a single metal covered layer of bumps is used. Using laser beam reading there may be two such layers of spiral bump tracks on each side of the optical disc. Consequently, for the high recording density four layer DVDs, there could be two layers on each side of the disc. In such two layer to a disc side structures, an aluminum layer is sputtered behind the inner layers as the reflective laser readable layer. A semi-reflective layer is used for the outer layers that allows the laser beam to focus through the outer layer onto the inner layer. Thus, the laser beam may be appropriately focused to read the spiral track on either layer.

Both the DVDs and CDs used for audio and video in commercial electronics, as well as for books on discs, are permanent read-only digital recordings.

SUMMARY OF THE PRESENT INVENTION

The present invention provides the personal consumer with the means to personalize his compact optical recording discs. The invention provides a compact optical recording disc comprising a primary section including a read-only permanent digital data recording and an ancillary read-write section enabling a user to digitally record data to thereby personalize the recording disc to the needs of the user. The section including the read-only permanent digital recording is on a spiral track on said recording disc, and the read-write section is on a spiral track extension continuous with the continuous track.

Preferably, the read-only spiral track comprises a layer of sequential bumps defining the permanent digital data recording pattern; and the read-write spiral track extension comprises a smooth layer of laser beam sensitive material, the material reversibly darkens upon exposure to define the digital data recording pattern.

The present invention is applicable to DVDs, in which case the section including said read-only permanent digital recording comprises a plurality of layers superimposed upon each other in a DVD format, each layer including a spiral track of sequential bumps defining a permanent digital data recording pattern.

The defined permanent digital recording may be an electronic entertainment audio/video presentation, in which case the ancillary read-write section enables the user to annotate the presentation with personal comments and organization. If the defined permanent digital recording is a recorded book of text, the ancillary read-write section enables the user to annotate the presentation with personal comments and organization.

The present invention also provides a general method of producing a compact optical recording disc that enables a user to personalize the disc comprising masking an ancillary section of the disc, forming in the unmasked primary section of the disc a read-only permanent digital data recording in a layer including a spiral track of sequential bumps defining a permanent digital data recording pattern, unmasking this ancillary section and forming in the unmasked ancillary section of the disc, a spiral track extension continuous with said continuous track, the extension comprising a smooth layer of laser beam sensitive material, said material reversibly darkens upon exposure to define the digital data recording pattern.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
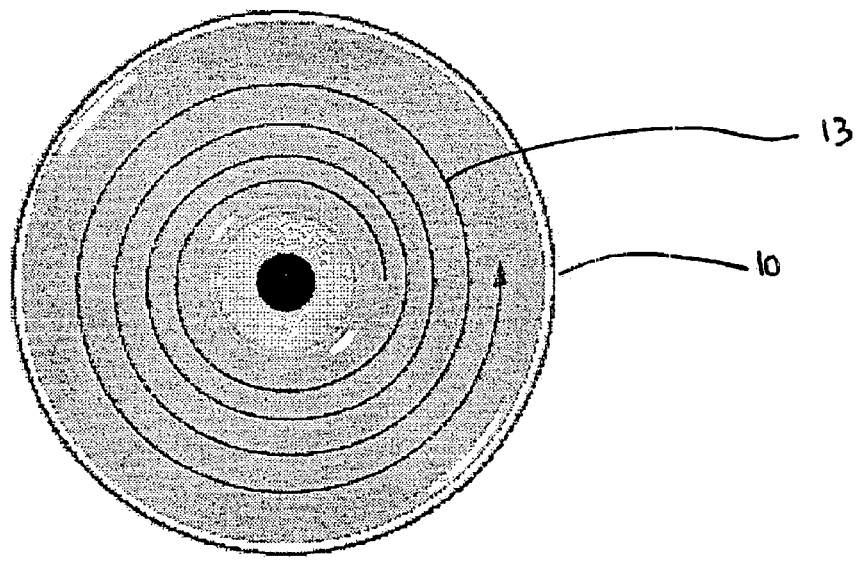
FIG. 1 is a generalized diagrammatic top view of a conventional Compact Disc.
Figure 2:
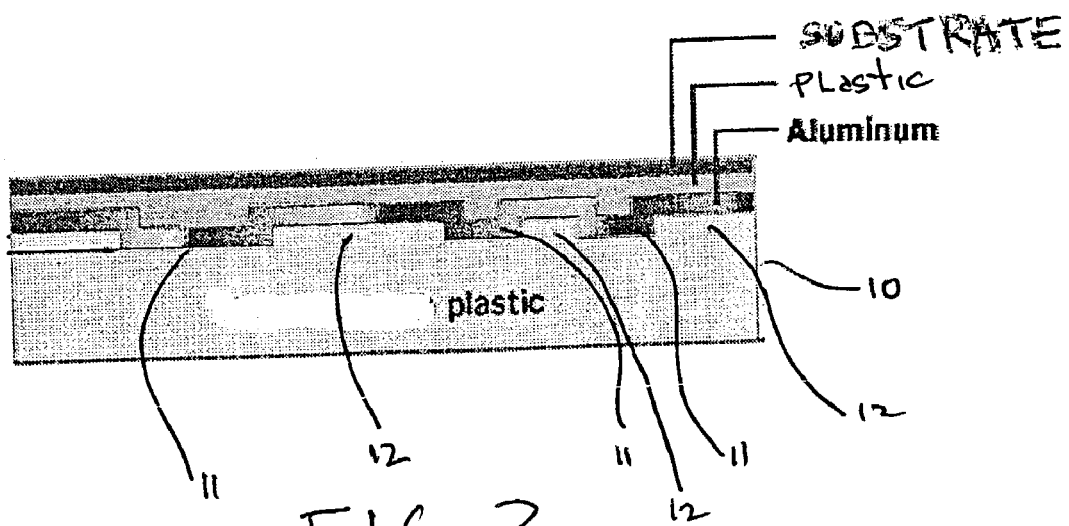
FIG. 2 is a generalized diagrammatic cross-section through a portion of a conventional compact disc.

Referring to FIG. 1, there is shown a conventional CD (compact optical recording disc) 10 as previously described having a single spiral track 13 of data which circles from the inside of the disc to the outside. Note, the dimensions have been enlarged for purposes of illustration. Actually, the tract is about 0.5 microns wide with about 1.6 microns separating one track turn from the next adjacent track turn. The above-described molded plastic bumps that define the data in the track are for an illustrative example, about 0.8 microns long, but only about 120 nanometers tall. The disc is inverted as shown in FIG. 2 and the laser beam is directed to and reads from the bottom of the disc. Thus, as shown in FIG. 2, a molded plastic member is covered on its smooth base with a substrate that is usually the paper label for the CD. The bumpy or readable side of the plastic layer is covered with a sputtered coating of the reflective aluminum whereby the coated bumps 11 will reflect the readable laser beam to define the read data pattern.

In accordance with this invention, a relatively small portion 15 of the compact disc 10 as defined by border 14 is structured in a read-write optical compact disc format so that the section will be available for the user to write onto the disc to provide personalization data, such as annotations and like entries that aid the user in organizing the subject matter of the permanent read-only recording to the user's needs. For purposes of illustration, the large size of the read-write region 15 has been greatly exaggerated. In practice, it would be expected to include less than 5% of the recordable area on the compact disc. This read-write area would conveniently be the initial or central most portion of the spiral track.

Figure 3:
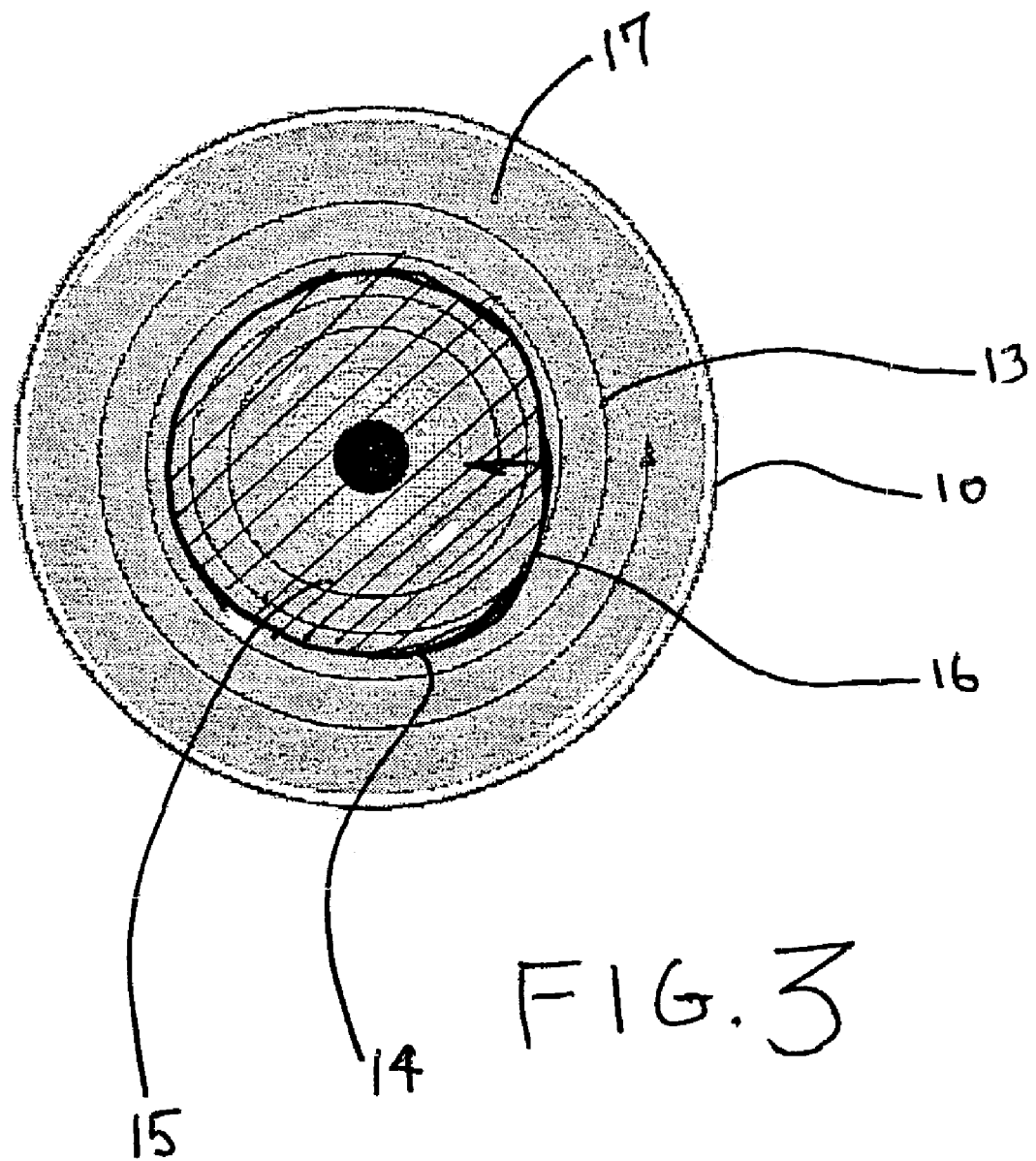
FIG. 3 is a generalized diagrammatic top view of a conventional compact disc modified to illustrate the present invention.
Figure 4:
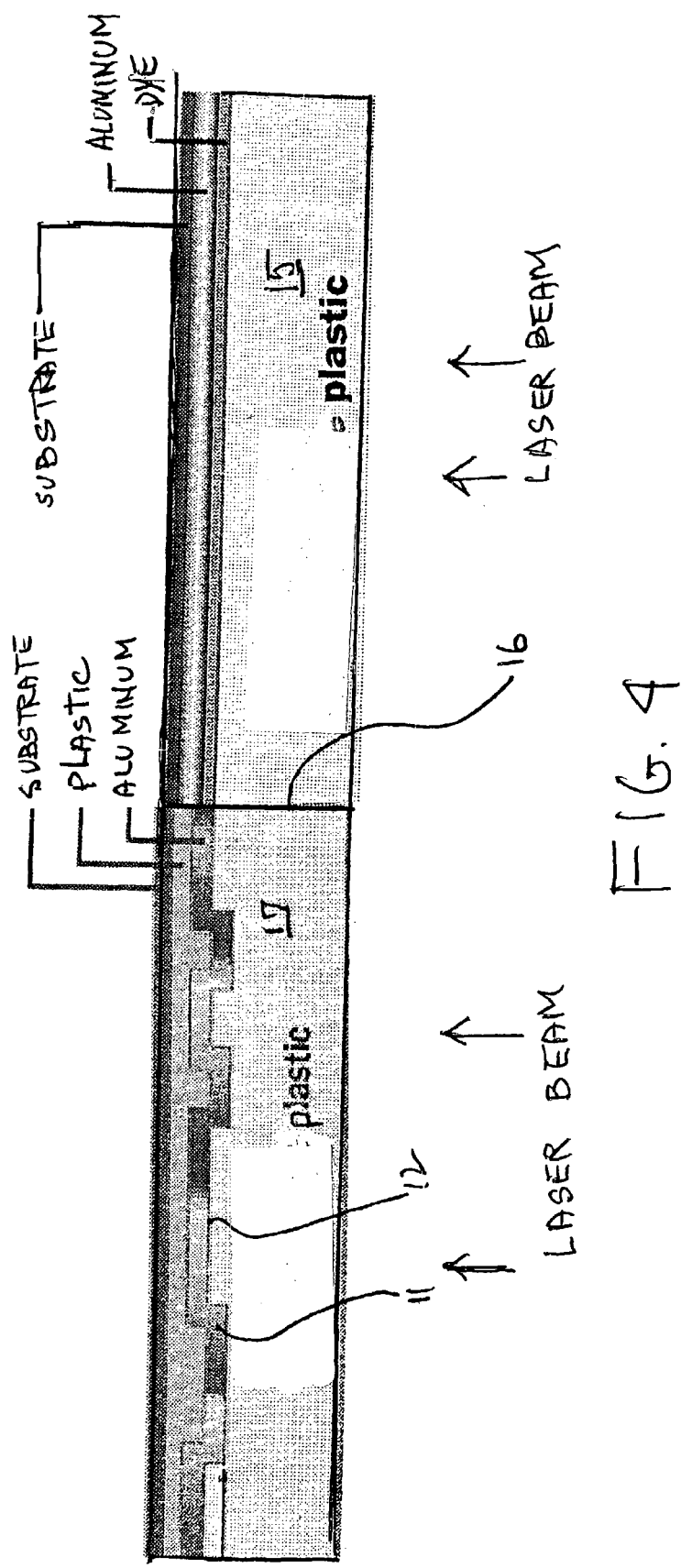
FIG. 4 is a generalized diagrammatic cross-section through a portion of a compact disc in accordance with the present invention.
Figure 5:
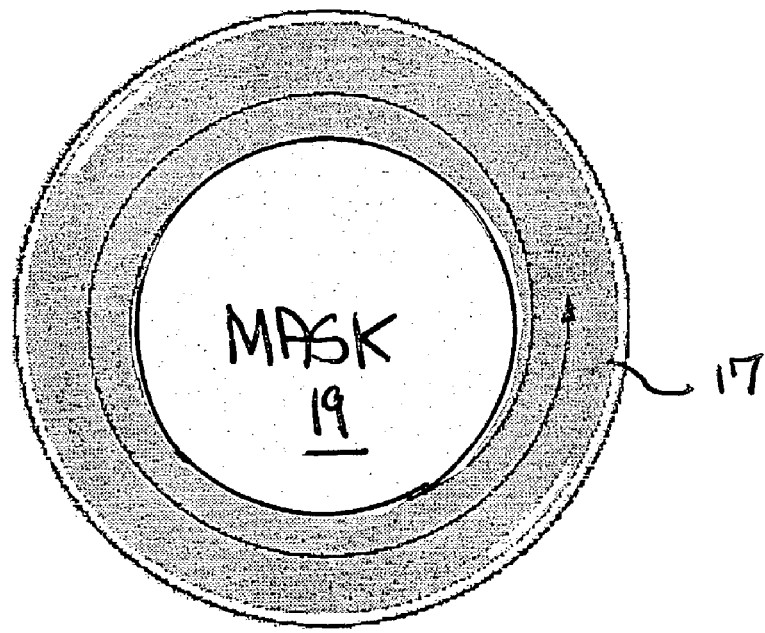
FIG. 5 is a generalized illustrative view of a first masking step in a process to produce a compact disc in accordance with the present invention.
Figure 6:
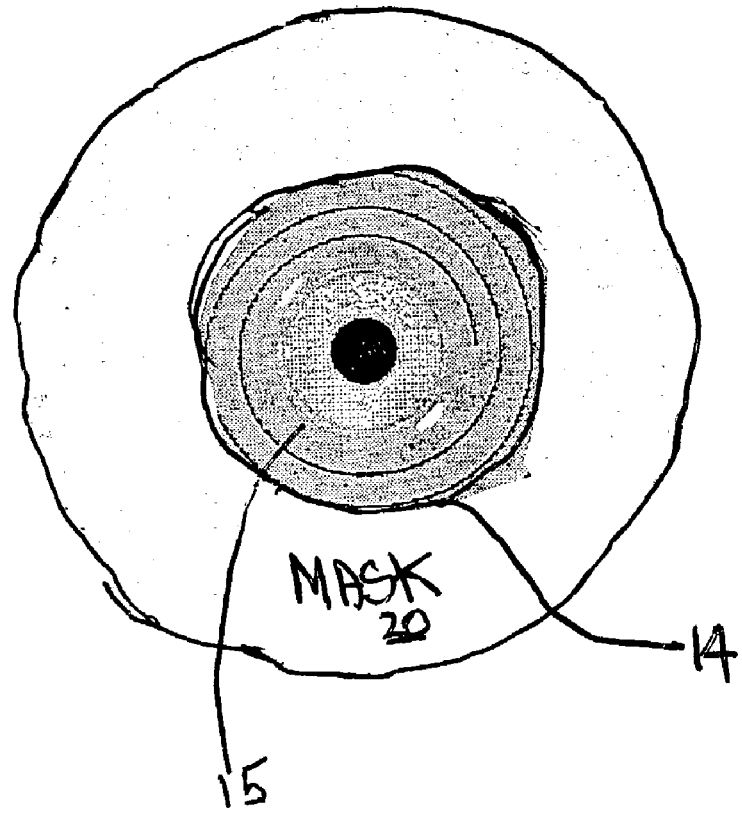
FIG. 6 is a generalized illustrative view of a second masking step in a process to produce a compact disc in accordance with the present invention.

As will be hereinafter described with respect to FIGS. 5 and 6, the read-write area 15 and the read-only area 17 may be separately processed while the other area is masked. FIG. 4 provides an illustrative sectional diagrammatic view showing the respective read-write 15 and permanent read only 17 areas of the disc. Note the structures are compared at a transition point 16, also shown in FIG. 3, at which the spiral track changes from a read-write to a read-only optical disc data path. The read-only area 17 has the read-only compact digital disc structure as has been previously described. The read-write section 15 has a conventional read-write or CD-R structure. There are no bumps. Instead, there a smooth reflective metal layer (aluminum) sitting on a layer of photosensitive dye. When the disc has no data, the dye is translucent. In this state, the laser beam, which reflected as shown, will reflect off the metal surface. However, during a burn cycle, i.e. a write cycle, the dye layer is selectively subjected to concentrated light of a particular frequency and intensity that turns portions opaque to light (not shown). Thus, by such selective darkening along the spiral track, a CD pattern is created that a standard CD player can read. The light from the CD player's laser beam will bounce back only from the non-darkened areas in the dye layer that are still translucent.

With this expedient, a user with conventional word processing computer techniques may write his annotations that are stored and then conventionally written into the read-write regions during the "CD burn" cycle. The CD-R player-burner has a write laser assembly in addition to its read laser assembly. The write laser is more powerful than the read laser beam whereby it alters the surface rather than just bouncing light off the surface. The read and write laser beams move along the same outward spiral path as the disc spins.

Accordingly, in the practice of this invention, a player with CD-R functions must at least be used. Such a player will write as described above and will read substantially all types of CDs and CDRs. In standard CDRs, the written data cannot be erased. However, erasable CD-R technology is available, i.e. CD-RW technology. For simplicity in illustration, the CD-R technology has been used in the illustrative example to define the read-write section of the hybrid optical CD of the present invention. It should be understood that standard CD-RW technology may be alternatively used for this function. Standard CD-RW technology has a built in erase function based upon a phase-change of a chemical compound, e.g. a combination of silver, tellurium, indium and antimony. When heated to about 600 C., this compound liquifies; when cooled below 200 C., it solidifies. As an initial solid, the compound is translucent. When selectively heated during a write, the heated areas melt and resemble melted relatively opaque bumps. In the CD-RW, there is in addition to the two read and write lasers, a third erase laser that returns the written layer to its initial translucent state of course, if the read-write section of the optical disc uses such erase technology, then the CD drive and player used must be of the CD-RW type.

With respect to the primary read-only portion of the optical disc, here again, for simplicity in illustration, conventional CD technology has been used in the illustrative example to define the read-only section of the hybrid optical CD of the present invention. However, it should be understood that standard DVD technology may be alternatively used for the structure of the permanent read-only section. DVDs generally have the same diameter and thickness as CDs and are manufactured by similar methods; but the DVD has up to four layers of aluminum covered reflective bumps, with each layer being produced by a separate process in which a single metal covered layer of bumps is used. With laser beam reading there may be two such layers of spiral bump tracks on each side of the optical disc. Consequently, for the high recording density four layered DVDs, there should be two layers on each side of the disc. In such two layer to a disc side structures, an aluminum layer is sputtered behind the inner layers as the reflective laser readable layer but for the outer layer, a semi-reflective layer is used for the outer layers that allows the laser beam to focus through the outer layer onto the inner layer. Thus, the laser beam may be appropriately focused to read the spiral track on either layer.

In connection with DVD technology, there is now available DVD write technology that is currently available. However, this technology is still quite expensive. Consequently, while it is within the scope of the invention to use DVD technology for the ancillary read-write sections of the compact discs, there is insufficient need for the large storage capacities of DVDs for user personalization of discs necessary to justify the costs of writable DVD processing and equipment.

Irrespective of the specific processing techniques, described above, used to produce the two respective sections of the discs of this invention, each of the two processes may be separately and discretely carried out while the other section is masked and protected from the processing of the unmasked section. As illustrated in FIGS. 5 and 6, in the first stage in FIG. 5, in the manufacture of the discs, the read-write section 15 may be masked by mask 19 while the permanent read-only section 17 is being processed. Then, in the second stage in FIG. 6, in the manufacture of the discs, the read-only section 17 may be masked by mask 20 while the read-write section 15 is being processed. It will be understood that appropriate photoresist masking techniques well known in the microelectronic fields may be selectively used for the masking.

Although certain preferred embodiments have been shown and described, it will be understood that many changes and modifications may be made therein without departing from the scope and intent of the appended claims.

What is claimed is:

1. A method of producing a compact optical recording disc enabling a user to personalize the disc comprising:
    masking an ancillary section of the disc;
    forming in the unmasked primary section of the disc a read-only permanent digital data recording in a plurality of layers superimposed upon each other in a DVD format, each layer including a spiral track of sequential bumps defining a permanent digital data recording pattern; and
    forming in said unmasked ancillary section of the disc, a spiral track extension continuous with said continuous track, said extension comprising a smooth layer of laser beam sensitive material, said material reversibly darkens upon exposure to define the digital data recording pattern.

* * * * *